(12) United States Patent  (10) Patent No.: US 6,325,240 B1
Gruber                     (45) Date of Patent:     Dec. 4, 2001

(54) REFUELING CAP ASSEMBLY

(75) Inventor: Herbert Gruber, Rochester Hills, MI (US)

(73) Assignee: Tesma International, Inc., Concord (CA)

( * ) Notice: Subject to any disclaimer, the term of this patent is extended or adjusted under 35 U.S.C. 154(b) by 0 days.

(21) Appl. No.: 09/477,701

(22) Filed: Jan. 6, 2000

Related U.S. Application Data

(60) Provisional application No. 60/114,935, filed on Jan. 6, 1999.

(51) Int. Cl.$^7$ ............................................. B65D 45/22
(52) U.S. Cl. .................. 220/835; 220/326; 220/DIG. 33; 292/87
(58) Field of Search .................................. 220/315, 324, 220/326, 281, 282, 283, 86.2, DIG. 33, 835, 375; 292/87, 145, 341.15, DIG. 4

(56) References Cited

U.S. PATENT DOCUMENTS

| | | | |
|---|---|---|---|
| 3,358,574 | * 12/1967 | Leverano | ................................ 292/87 |
| 3,909,050 | * 9/1975 | Vicendese et al. | ..................... 292/87 |
| 4,177,931 | 12/1979 | Evans . | |
| 4,657,292 | * 4/1987 | Bruck | ..................................... 292/80 |
| 4,709,949 | * 12/1987 | Umezawa et al. | ............... 292/DIG. 4 |
| 4,794,768 | 1/1989 | Moser et al. . | |
| 4,952,160 | * 8/1990 | Olsen | ..................................... 220/326 |
| 5,000,339 | 3/1991 | Wheat et al. . | |
| 5,327,946 | 7/1994 | Perkins . | |
| 5,435,358 | 7/1995 | Kempka et al. . | |
| 5,472,108 | 12/1995 | Skudlarek . | |
| 5,503,199 | 4/1996 | Whitley, II et al. . | |
| 5,507,324 | * 4/1996 | Whitley, II et al. | ................. 220/86.2 |
| 5,524,786 | 6/1996 | Skudlarek . | |
| 5,836,628 | * 11/1998 | Slocum | ............................... 220/86.2 |

* cited by examiner

Primary Examiner—Nathan J. Newhouse
(74) Attorney, Agent, or Firm—Howard & Howard

(57) ABSTRACT

A refueling cap assembly for opening and closing a filler neck of a fuel tank has a frame which is mounted to the filler neck of the fuel tank. A cover is pivotally mounted to the frame to move between open and closed positions for opening and closing the filler neck. A locking mechanism, having a locking body, is mounted to the frame for securing the cover to the filler neck in the closed position. The locking body moves between a locked position engaging a finger projecting from the cover to secure the cover to the filler neck, and a release position releasing the cover from the filler neck. The cap assembly is characterized by the locking body moveable in a flip flop manner and having a first abutment to retain the locking body in the locked position when the cover is in the closed position, and a second abutment to retain the locking body in the released position when the cover is in the open position. The locking body flip flops between the locked and released positions upon repeated engagement of the cover with the locking mechanism.

19 Claims, 5 Drawing Sheets

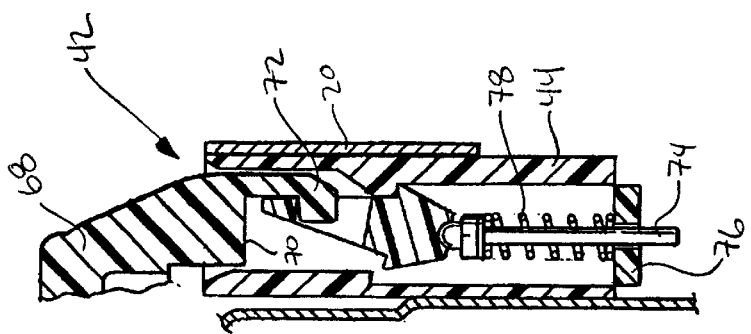
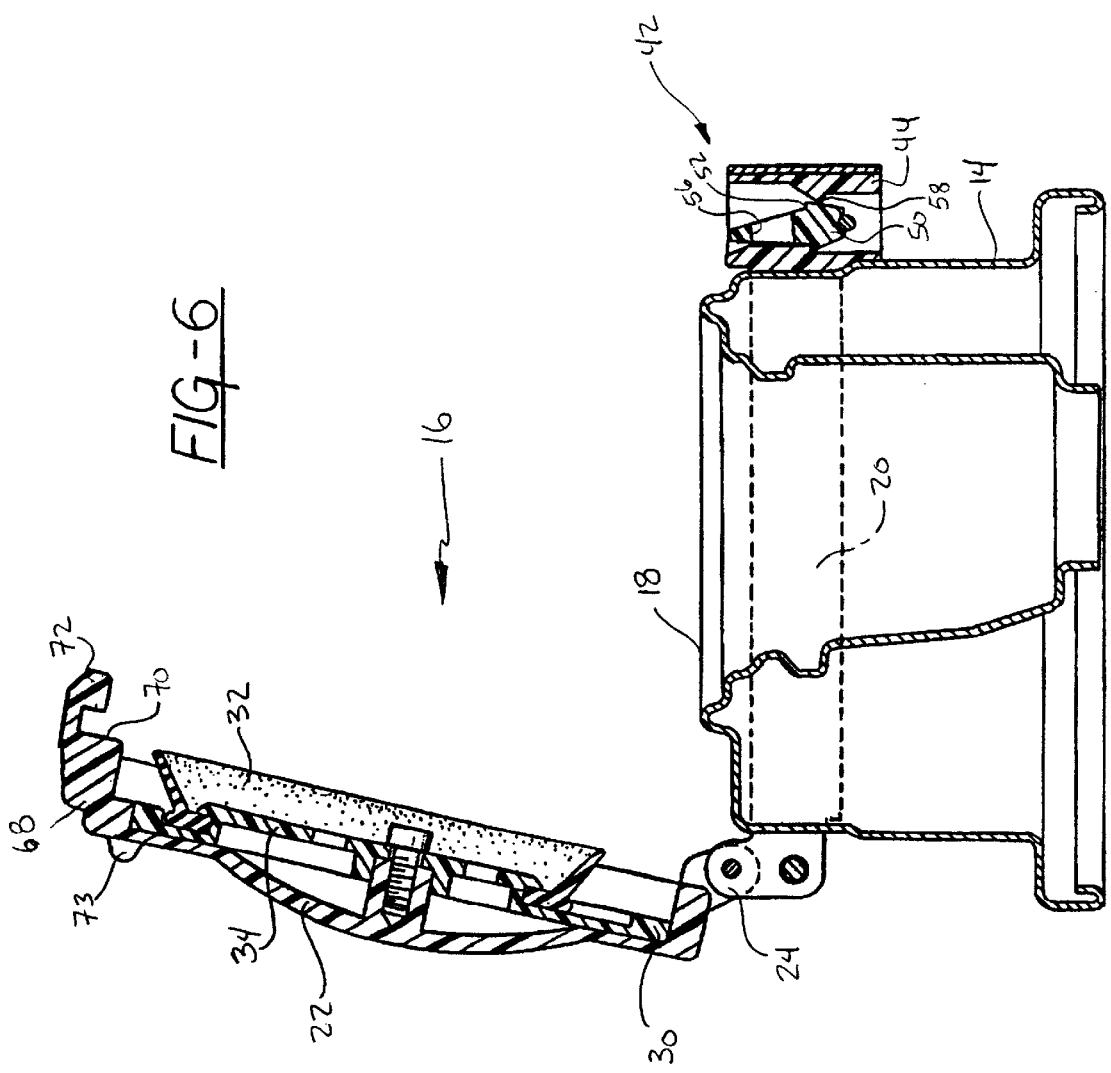

REFUELING CAP ASSEMBLY

RELATED APPLICATION

This patent application claims priority to and all the benefits of U.S. Provisional patent application Ser. No. 60/114,935, filed on Jan. 6, 1999 and entitled Refueling Cap Assembly.

FIELD OF THE INVENTION

The subject invention relates to a refueling cap assembly for the refueling of automotive fuel tanks.

BACKGROUND OF THE INVENTION

Most vehicle fuel tanks include a filler neck extending from the tank to allow a user to refill the tank with fuel. Some type of cap or cover is placed over the filler neck in order to seal the fuel tank from the atmosphere. Fuel tanks should be tightly capped to avoid the dangers of igniting the gasoline, to prevent environmental harm due to the escape of gasoline vapors and to reduce the intrusion of contaminates into the fuel tank.

The most common type of cover is a gas cap. Conventional gas cap assemblies are typically threaded onto the filler neck and include some type of locking handle. Each time the fuel tank is replenished, the gas cap must be unscrewed at the start of the refueling operation and then screwed back into position at the end of the refueling. Over time the interior ratcheting mechanism of the gas cap may wear out such that the gas cap may not be adequately secured to the filler neck or may be over-tightened. In the situation of the gas cap being over-tightened, the user may have great difficulty in subsequently removing the gas cap. In addition, the twisting removal of the gas caps creates a consistent inconvenience for the user, especially in inclement weather.

The prior art has also contemplated the use of a pivotal cover moveable between open and closed positions to open and close the filler neck. Examples of such pivotal covers for fuel tanks are shown in U.S. Pat. Nos. 5,327,946 and 5,503,199. An advantage of these designs is that the user does not have to remove the gas cap to fill the fuel tank. These prior art pivotal gas caps, however, require a separate locking device which must be independently actuated to facilitate the opening of the cover. Due to the confined spaces in which the pivotal cover is associated and the relatively small size of the locking device, the separate actuation of this device can be cumbersome and difficult to accomplish.

Accordingly, it is desirable to develop a gas cap cover which pivots between open and closed positions to open and close a filler neck of a fuel tank without actuating a separate locking device.

SUMMARY OF THE INVENTION

The disadvantages of the prior art may be overcome by providing a refueling cap assembly for selectively opening and closing a filler neck of a fuel tank. The cap assembly comprises a frame adapted for attachment to the filler neck of the fuel tank. A cover is pivotally mounted to the frame between open and closed positions for opening and closing the filler neck. A locking mechanism is mounted to the frame for selectively securing the cover to the filler neck in the closed position. The locking mechanism includes a locking body between a locked position engaging at least a portion of the cover to secure the cover to the filler neck, and a release position releasing the cover from the filler neck. The cap assembly is characterized by the locking body being movable moveable in a flip flop manner and having one abutment to retain the locking body in the locked position when the cover is in the closed position, and a second abutment to retain the locking body in the released position when the cover is in the open position. The locking body flip flops between the locked and released positions upon repeated engagement of the cover with the locking mechanism.

Accordingly, the cap assembly may be opened and closed by simply actuating the cap itself. A separate locking device need not be actuated. This unique design creates a convenient means of opening and closing a filler neck of a fuel tank.

BRIEF DESCRIPTION OF THE DRAWINGS

Other advantages of the present invention will be readily appreciated as the same becomes better understood by reference to the following detailed description when considered in connection with the accompanying drawings wherein:

FIG. 6 is a cross-sectional radial view of the refueling cap assembly of FIG. 1 mounted to a filler neck of a fuel tank and shown in a completely open position;

FIG. 9 is an enlarged cross-sectional radial view of an alternative embodiment of the locking mechanism for the refueling cap assembly of the present invention.

DETAILED DESCRIPTION OF THE PREFERRED EMBODIMENT

Figure 1:
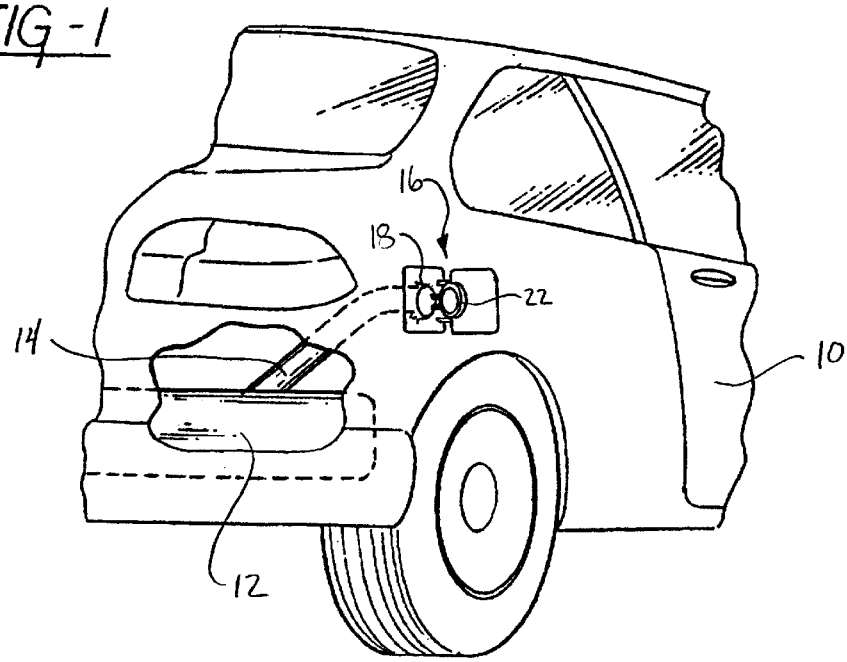
FIG. 1 is a perspective view of a vehicle incorporating a refueling cap assembly in accordance with the subject invention.

Referring to the Figures, wherein like numerals indicate like or corresponding parts throughout the several views, a vehicle 10 having a fuel tank 12 with a filler neck 14 is shown in FIG. 1. The filler neck 14 extends upward from the fuel tank 12 to allow a user to refill the tank 12 with fuel. The type of fuel tank 12, shape of the filler neck 14 and type of vehicle 10 do not form a positive part of the subject invention and may be of any suitable model or design.

The filler neck 14 has a refueling cap assembly, generally shown at 16, covering a top of the filler neck 14. The cap assembly 16 seals against an annular ridge 18 of the filler neck 14 in order to seal the fuel tank 12 from the atmosphere and prevent the intrusion of dust, water and other impurities.

Figure 2:
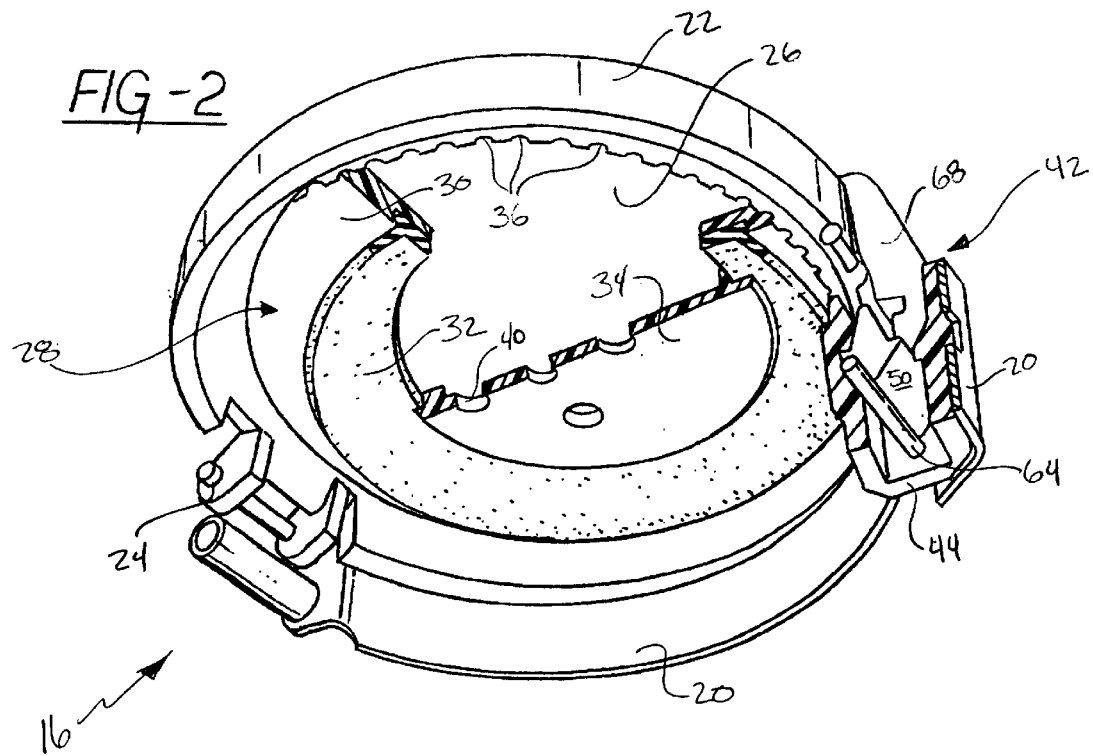
FIG. 2 is a partially broken away perspective view of the refueling cap assembly of FIG. 1.
Figure 3:
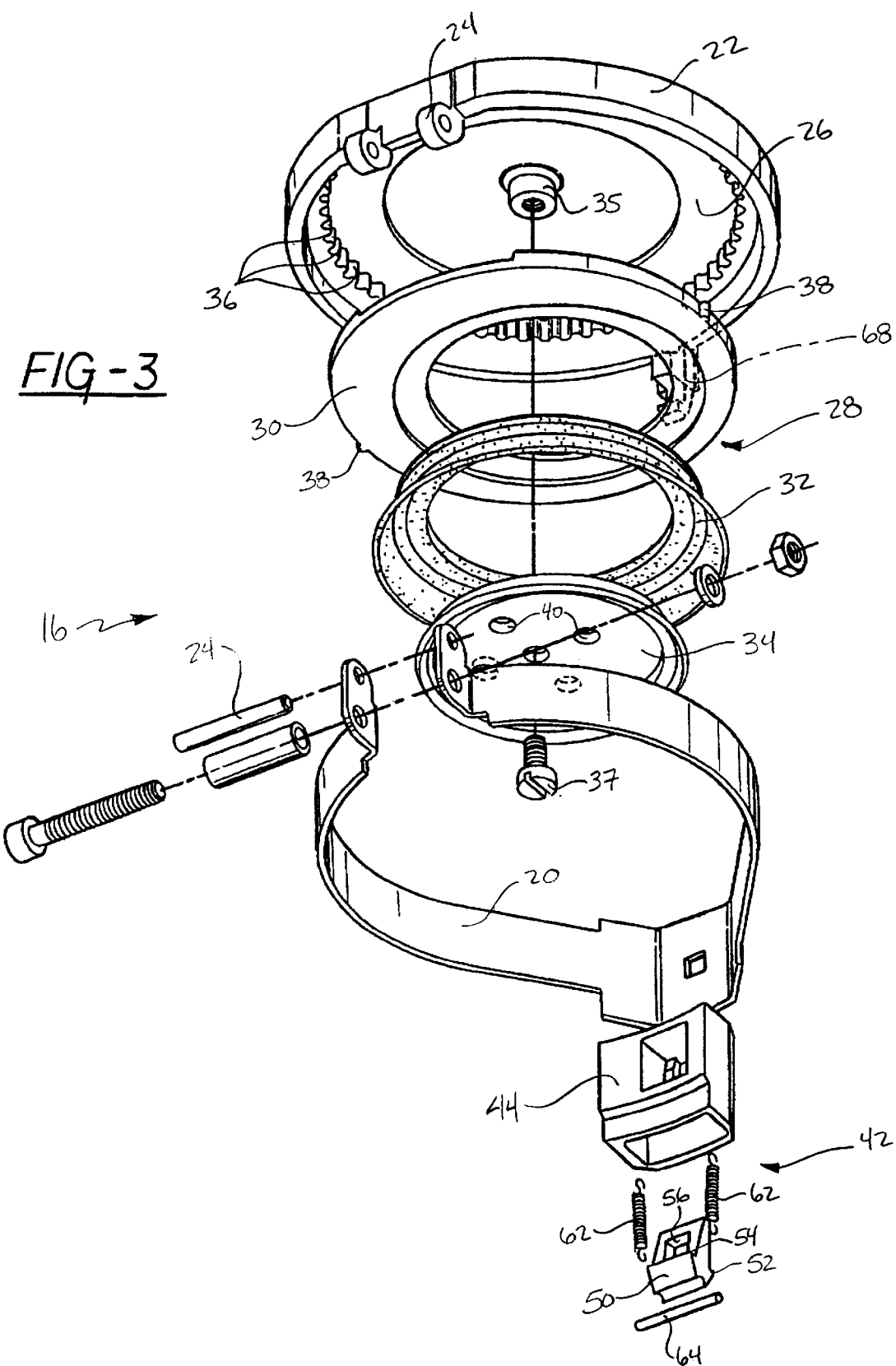
FIG. 3 is an exploded perspective view of the refueling cap assembly of FIG. 1.

Referring to FIGS. 2 and 3, the cap assembly 16 comprises a frame 20 adapted for attachment to the filler neck 14 of the fuel tank 12. Preferably, the frame 20 is an annular metal ring which is clamped or otherwise affixed to the top of the filler neck 14. A cover 22 is pivotally mounted to the frame 20 via a hinge 24. The cover 22 moves between open and closed positions for opening and closing the filler neck 14.

Preferably, the cover 22 is disc shaped having a diameter substantially similar to the diameter of the frame 20. A cover spring (not shown, but known in the art) is disposed about the hinge 24 to continuously bias the cover 22 to the open position. The cover 22 may be formed of plastic or metal. The cover 22 preferably includes an outer lip encompassing an inner recess 26.

The recess 26 houses a sealing structure, generally shown at 28, which sealingly engages the annular ridge 18 of the filler neck 14 when the cover 22 is in the closed position. The sealing structure 28 has an annular seal support 30 directly engaging the recess 26. A resilient annular seal 32, preferably made of rubber, seats against the seal support 30. An annular plate 34 is bolted to the cover 22 and wedges the seal 32 and seal support 30 against the cover 22. The sealing structure 28 has a configuration which is complementary to the configuration of the annular ridge 18 of the filler neck 14.

The sealing structure 28 also provides a breathing function for the fuel tank 12. A plurality of notches 36 are formed within the recess 26 of the cover 22. The seal support 30 includes a pair of ribs 38 which engage the notches 36 to non-rotatably secure the seal support 30 to the cover 22.

The plate 34 includes a number of holes 40 which open into the recess 26 of the cover 22. Cover 22 has an internally threaded column 35. Screw 37 extends through plate 34 to threadingly engage column 35 to retain plate 34 in a spaced relation with the cover 22 and clamp the seal 32 against the support 30. Additionally, a filter mesh (not shown) could be disposed within the recess 26 between the plate 34 and cover 22.

When the cover 22 is closed and sealed with the filler neck 14, pressure builds up within the fuel tank 12. A particular pressure level is desired and is maintained to ensure proper operation of the fuel tank 12. If the pressure becomes to high, the vapors within the fuel tank 12 must be evacuated and similarly if the pressure becomes to low, air must be drawn into the fuel tank 12. If the pressure in the fuel tank 12 becomes excessive, the vapors can escape through the holes 40 and out through the notches 36 in the cover 22. As appreciated, a filter mesh would purify the vapors before exhaustion to the atmosphere. If the pressure in the fuel tank 12 is too low, i.e., a vacuum condition, then atmospheric air is drawn in through the notches 36 and through the holes 40. The filter mesh also ensures that no contaminates are drawn into the fuel tank 12. The sealing structure 28 is therefore a seal for the filler neck 14 and a simple breathing apparatus for the fuel tank 12.

Figure 8:
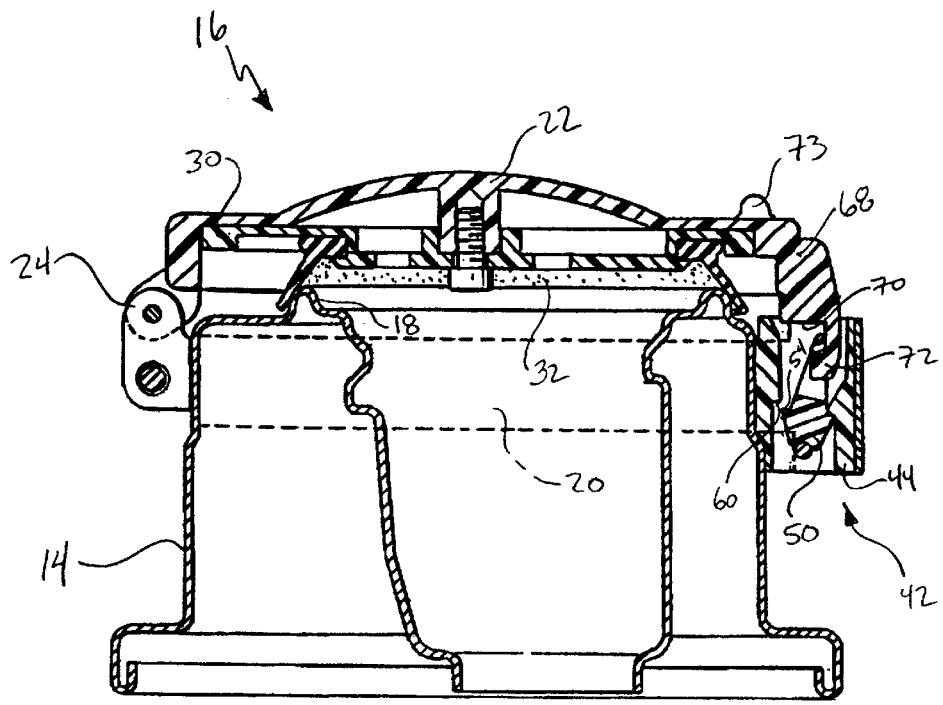
FIG. 8 is a cross-sectional radial view of the refueling cap assembly of FIG. 6 shown in a closed position.
Figure 7:
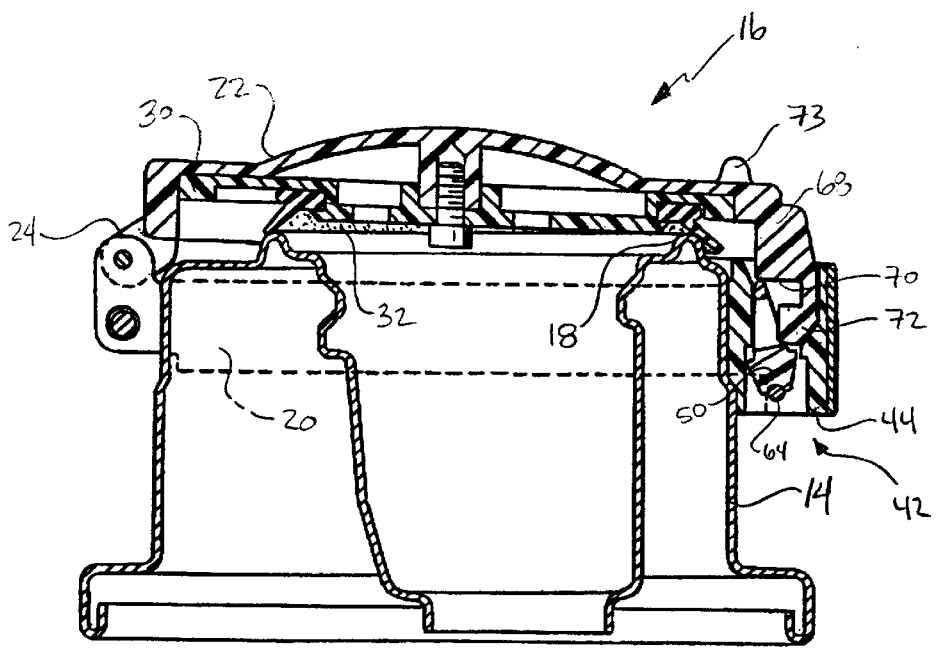
FIG. 7 is a cross-sectional radial view of the refueling cap assembly of FIG. 6 shown in an active condition.

As depicted in FIGS. 6–8, the annular ridge 18 is positioned off center relative to the central axis of the filler neck 14. This is desired for a particular vehicle specification. Similarly, the sealing structure 28 is off center in relation to the cover 22 in order to properly align with the annular ridge 18. The versatility of the subject cap assembly 16 allows for mounting of the frame 20 around any position along the filler neck 14. As appreciated, the sealing structure 28 may be positioned anywhere within the cover 22 such that the frame 20 may be mounted around the filler neck 14. Hence, the cap assembly 16 may be mounted to different filler neck 14 configurations for different vehicles.

A locking mechanism, generally shown at 42, is mounted to the frame 20 for selectively securing the cover 22 to the filler neck 14 in the closed position. The locking mechanism 42 is preferably mounted within a designated section of the frame 20. Preferably, the designated section is located on the opposite end of the frame 20 from the hinge 24.

Figure 4:
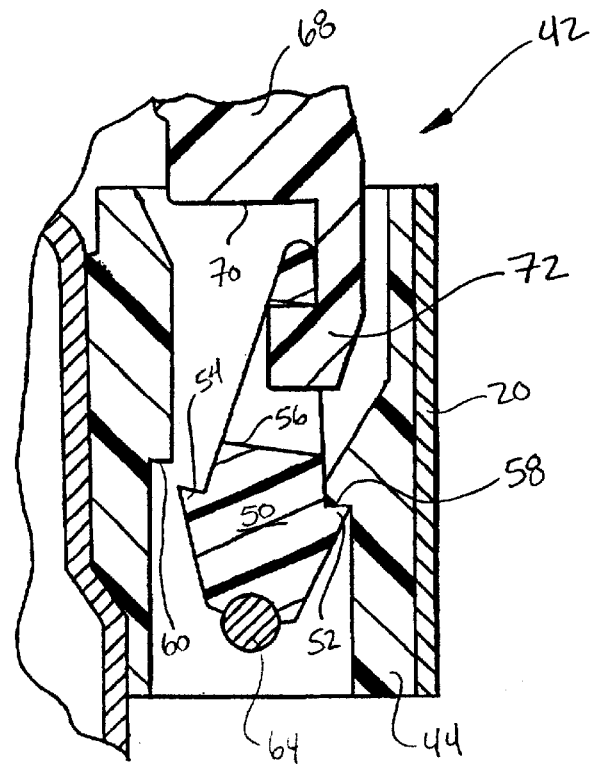
FIG. 4 is an enlarged cross-sectional radial view of a locking mechanism of the refueling cap assembly of FIG. 1.
Figure 5:
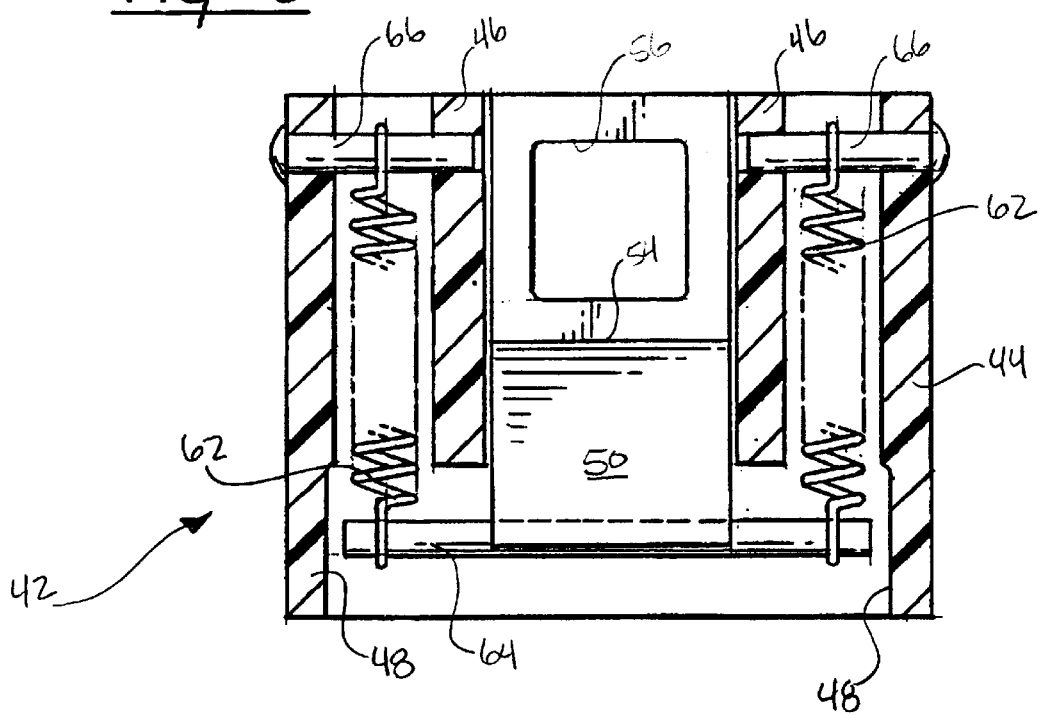
FIG. 5 is an enlarged cross-sectional circumferential view of the locking mechanism of FIG. 1.

Referring also to FIGS. 4 and 5, the locking mechanism 42 further includes a lock housing 44, preferably made of plastic. The lock housing 44 is substantially hollow and includes a pair of inner walls 46 defining an inner chamber having a top opening. The lock housing 44 also includes a pair of outer walls 48 disposed outside of the inner walls 46 to define a pair of outer chambers disposed outside of the inner chamber. The inner walls 46 separate the inner chamber from the outer chambers. As shown best in FIG. 5, the inner walls 46 extend only partially through the lock housing 44. In particular, the inner walls 46 terminate near a bottom portion of the lock housing 44 such that the inner chamber merges with the outer chambers to create a single bottom chamber.

The locking mechanism 42 also includes a locking body 50 at least partially encapsulated by the lock housing 44. Specifically, the locking body 50 is movably disposed within the inner chamber of the lock housing 44. The locking body 50 preferably includes a first abutment 52 and a second abutment 54 with the abutments 52, 54 disposed on opposite sides of the locking body 50. The locking body 50 has a substantially triangular or wedged shaped configuration with the abutments 52, 54 disposed near a base of the triangular locking body 50. The locking body 50 further includes an aperture 56 formed in the center thereof extending from side to side. The locking body 50 has an arcuate bottom notch formed in the base thereof.

The inner walls 46 of the lock housing 44 each has a first ledge 58 and a second ledge 60 which project inwardly into the inner chamber. The ledges 58, 60 and abutments 52, 54 are configured such that the first abutment 52 engages the first ledge 58 when the locking body 50 is in the locked position as the locking body 50 pivots in a clockwise direction as viewed in FIG. 4. Similarly, the second abutment 54 engages the second ledge 60 when the locking body 50 is in the release position as the locking body 50 pivots in a counter clockwise as viewed in FIG. 4. The preferred configuration of the ledges 58, 60 is to have the second ledge 60 disposed closer to the top opening of the lock housing 44 relative to the first ledge 58 such that the second ledge 60 is positioned relatively above the first ledge 58. The separate engagement of the ledges 58, 60 and abutments 52, 54 separately secure the locking body 50 in the locked and released positions. Preferably, the movement of the locking body 50 between the locked and release positions is substantially parallel to a major axis of the filler neck 14. The first 52 and second 54 abutments of the locking body 50 define a width of the locking body 50 which is slightly larger than the opening defined by the inwardly projecting ledges 58, 60.

Locking body 50 is pivotally mounted on lower rod 64 engaging with the bottom notch of the locking body 50. A pair of springs 62 is disposed within the outer chambers and is connected between lower rod 64 and upper pins 66. Each of the springs 62 allows the locking body 50 to translate relative to the lock housing 44 and continuously biases the locking body 50 toward the top opening of the lock housing 44 and into engagement with one of the first 58 and second 60 ledges. The slightly larger width of the locking body 50 relative to the opening defined within the lock housing 44 ensures that the locking body 50 will remain within the inner chamber even though the actuator is continuously biasing the locking body 50 upward.

A locking finger 68 extends outwardly from the cover 22 for selective engagement with the locking body 50.

Specifically, the locking finger 68 includes an abutment 70 and a hook 72 with the abutment 70 engaging the locking body 50 during the repeated movement of the cover 22 between the open and closed positions. The hook 72 of the finger 68 extends into the aperture 56 during the closing of the cover 22 to secure the cover 22 to the filler neck 14. As illustrated, a notch is formed in the finger 68 between the abutment 70 and the hook 72 such that a top of the locking body 50 is secured between the abutment 70 and hook 72 when the cover 22 is in the closed position.

The operation of the preferred embodiment of the cap assembly 16 will now be discussed in detail with reference to FIGS. 6 through 8. For discussion purposes, the cover 22 is initially in an open position pivoted away from the filler neck 14 as shown in FIG. 6. The cover spring maintains the cover 22 in the open position. While the cover 22 is opened, the second abutment 54 of the locking body 50 is in engagement with the second ledge 60. The second ledge 60 is located relatively higher within the lock housing 44 than the first ledge 58. Hence, the locking body 50 is disposed at the highest position within the lock housing 44. Preferably, the tip of the locking body 50 is aligned with the top opening of the housing 44. The upper pins 66 and lower rod 64 and the springs 62 maintain the locking body 50 in this upward position. The locking body 50 is in the counter clockwise position with the aperture 56 exposed.

To close the cover 22 and seal the top of the filler neck 14, a user pivots the cover 22 about the frame 20 by providing enough force to overcome the biasing force of the cover spring. As shown in FIG. 7, the abutment 70 of the finger 68 contacts the tip of the locking body 50 and the hook 72 aligns with the aperture 56 in the locking body 50. As the user continues to push the cover 22 toward the closed position, the hook 70 pushes the locking body 50 downwardly into the inner chamber. The push by the hook 70 is beyond centre relative to the axis of rotation of the locking body 50. The hook 70 will urge the locking body 50 to rotate in a locking sense (clockwise in FIG. 4). This movement continues until the locking body 50 flips such that first abutment 52 is positioned below the first ledge 58. Specifically, the springs 62 shift or flips the locking body 50 such that the first abutment 52 aligns underneath the first ledge 58. The user releases the cover 22 and the bias of the cover 22 will urge upwardly until the hook 72 engages with the upper portion of the locking body 50. At this point, the cover 22 is locked. As appreciated, the sealing structure 28 is now compressed and sealed around the ridge 18 of the filler neck 14.

If the user desires to open the cover 22, essentially the reverse of the above operation occurs. Specifically, the user pushes downwardly on the cover 22 which engages the abutment 70 with the tip of the locking body 50. A knob 73 is provided on the top of the cover 22 to provide an actuation surface for the user when pushing on the cover 22. The locking body 50 is then pushed downwardly which disengages the first abutment 52 from the first ledge 58. The bias of springs 62 will counter rotate or flop the locking body 50 such that the second abutment 54 aligns underneath the second ledge 60. The locking body 50 can now move upwardly through the inner chamber until the second abutment 54 engages the second ledge 60. As discussed above, the second ledge 60 is positioned higher within the inner chamber than the first ledge 58. This allows the locking body 50 to engage the second ledge 60 without interfering with the first ledge 58. Specifically, the locking body 50 pivots counter clockwise which removes the opening from surrounding engagement with the hook. The cover 22 can now pivot away from the housing 44 to the open position and the locking mechanism 42 has returned to the original open state as shown in FIG. 6.

An alternative embodiment is shown in FIG. 9 wherein the actuator is replaced by a spring biased post 74. The top of the post 74 engages the notch within the base of the locking body 50 to continuously bias the locking body 50 upwardly. The bottom of the post 74 slides within a mounting plate 76 wherein the post 74 can pivot to provide the flip-flop motion of the locking body 50. A coiled spring 78 surrounds the post 74 to continuously bias the post 74 toward the locking body 50. The spring 78 engages the post 74 at a first end and the mounting plate 76 at a second end. All other aspects of the locking mechanism 42 and refueling cap assembly 16 are essentially identical to the preferred embodiment.

The invention has been described in an illustrative manner, and it is to be understood that the terminology which has been used is intended to be in the nature of words of description rather than of limitation. It is now apparent to those skilled in the art that many modifications and variations of the present invention are possible in light of the above teachings. It is, therefore, to be understood that within the scope of the appended claims the invention may be practiced otherwise than as specifically described.

What is claimed is:

1. A refueling cap assembly for selectively opening and closing a filler neck of a fuel tank, said assembly comprising;

a frame adapted for attachment to the filler neck of the fuel tank;

a cover pivotally mounted to said frame and movable between open and closed positions for opening and closing the filler neck;

a locking mechanism mounted to said frame for selectively securing said cover to the filler neck in said closed position, said locking mechanism including a locking body moveable in a flip-flop motion between a locked position engaging at least a portion of said cover to secure said cover to the filler neck, and a release position releasing said cover from the filler neck;

said assembly characterized by said locking body having a first abutment to retain said locking body in said locked position when said cover is in said closed position, and a second abutment to retain said locking body in said released position when said cover is in said open position, said locking body flip-flopping between said locked and released positions upon successive engagements of said cover with said locking mechanism.

2. An assembly as set forth in claim 1 wherein said first abutment and said second abutment are disposed on opposite sides of said locking body for separately securing said locking body in said locked and released positions.

3. An assembly as set forth in claim 2 wherein said locking body has a substantially triangular configuration with said abutments disposed near a base of said triangular locking body.

4. An assembly as set forth in claim 2 wherein said locking mechanism further includes a lock housing at least partially encapsulating said locking body.

5. An assembly as set forth in claim 4 wherein said lock housing includes a pair of inner walls defining an inner chamber having a top opening.

6. An assembly as set forth in claim 5 further including first and second ledges disposed on said inner walls and projecting inwardly into said inner chamber.

7. An assembly as set forth in claim 6 wherein said locking body is disposed within said inner chamber of said lock housing such that said first abutment engages said first ledge when said locking body is in said locked position and said second abutment engages said second ledge when said locking body is in said release position.

8. An assembly as set forth in claim 7 wherein said flip-flop movement of said locking body between said locked and release positions is substantially parallel to a major axis of the filler neck.

9. An assembly as set forth in claim 7 wherein said second ledge is disposed closer to said top opening of said lock housing relative to said first ledge such that said second ledge is positioned above said first ledge.

10. An assembly as set forth in claim 9 further including an actuator mounted to said locking body to continuously bias said locking body into engagement with one of said first and second ledges.

11. An assembly as set forth in claim 10 further including a locking finger extending outwardly from said cover for selective engagement with said locking body.

12. An assembly as set forth in claim 11 wherein said locking finger includes an abutment and a hook with said abutment engaging said locking body during said repeated movement of said cover between said open and closed positions.

13. An assembly as set forth in claim 12 wherein said locking body further includes an aperture with said hook of said finger extending into said aperture during said closing of said cover and said movement of said locking body toward said locked position to secure said cover to the filler neck.

14. An assembly as set forth in claim 13 wherein said lock housing further includes a pair of outer walls disposed outside of said inner walls to define a pair of outer chambers disposed outside of said inner chamber.

15. An assembly as set forth in claim 14 wherein said actuator includes a pair of springs disposed within said outer chambers for continuously biasing said locking body toward said top opening of said lock housing.

16. An assembly as set forth in claim 15 further including a lower rod connected to each of said springs and engaging a base of said locking body to bias said locking body upwardly.

17. An assembly as set forth in claim 16 wherein said base of said locking body includes an arcuate bottom notch for retaining said lower rod.

18. An assembly as set forth in claim 13 wherein said actuator includes a mounting plate supporting a post which engages a base of said locking body to bias said locking body toward said top opening of said lock housing.

19. An assembly as set forth in claim 18 further including a spring disposed about said post for continuously biasing said post and said locking body upwardly.

* * * * *